United States Patent [19]

Suzuki et al.

[11] 4,285,038
[45] Aug. 18, 1981

[54] INFORMATION TRANSFER CONTROL SYSTEM

[75] Inventors: Seigo Suzuki, Yokohama; Seiji Eguchi, Kawasaki; Yoshiaki Moriya, Inagi, all of Japan

[73] Assignee: Tokyo Shibaura Electric Co., Ltd., Japan

[21] Appl. No.: 50,593

[22] Filed: Jun. 21, 1979

Related U.S. Application Data

[63] Continuation-in-part of Ser. No. 732,702, Oct. 15, 1976, abandoned.

[51] Int. Cl.³ .................. G06F 13/00; G06F 3/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,638,195 | 1/1972 | Brender et al. | 364/200 |
| 3,771,142 | 11/1973 | Minshull et al. | 364/200 |
| 3,818,461 | 6/1974 | Ward et al. | 364/900 |
| 3,878,513 | 4/1975 | Werner | 364/200 |
| 4,047,162 | 9/1977 | Dorey et al. | 364/900 |
| 4,106,091 | 8/1978 | Hepworth et al. | 364/200 |
| 4,120,028 | 10/1978 | Membrino et al. | 364/200 |
| 4,145,755 | 3/1979 | Suzuki et al. | 364/900 |

OTHER PUBLICATIONS

Dales et al., "FIFO Buffer Controls," IBM TDB, vol. 9, No. 10, 3/67, pp. 1334, 1335.

Primary Examiner—Harvey E. Springborn
Attorney, Agent, or Firm—Finnegan, Henderson, Farabow, Garrett & Dunner

[57] ABSTRACT

The system is constructed to operate to mutually transfer information between a processor and a terminal device via a first-in/first-out type stack. Signal generators are provided on the input and output sides of the stack for generating signals corresponding to the EMPTY and FULL statuses of the stack thereby controlling to inhibit or commence the transfer of the information in response to the direction of transfer of the information and the status of the stack.

4 Claims, 2 Drawing Figures

INFORMATION TRANSFER CONTROL SYSTEM

CROSS REFERENCE TO THE RELATED APPLICATION

This is a continuation-in-part application of U.S. patent application Ser. No. 732,702 filed on Oct. 15, 1976 now abandoned.

BACKGROUND OF THE INVENTION

This invention relates to an information transfer control system and more particularly to an information transfer control system wherein information is transferred through a first-in/first-out stack.

Where an information is transferred through a first-in/first-out type stack (hereinafter abbreviated as FIFO stack) the stack is provided between one information processing device and another information processing device and acts as an efficient interface for temporarily storing the information.

To operate the FIFO stack normally two types of status signals are necessary, a FULL signal representing a state in which the FIFO stack is filled with present data and an EMPTY signal representing a state wherein there is no present data in the FIFO stack.

Although it is possible to generate signals from the FIFO stack, in the presently used FIFO stack only the FULL signal among the status signals is used to control the commencement and inhibition of the transfer of the information in response to the FULL signal.

Where there is no data in the FIFO stack it is meaningless to try to take out data from the FIFO stack. When the FIFO stack is full of data, and when looked at from the data receiving side, it is necessary to prohibit the data transmitting side from further transferring data to the FIFO, but the data transmitting side may transfer data to the receiving side (machine ready state). Accordingly, it is advantageous to rapidly transfer the data stored in the stack to the receiving side. In other words, where the status of the FIFO stack is FULL, conditions are quite different on the data transmission side and the data receiving side.

Accordingly, in a prior art information transfer control system utilizing a conventional FIFO stack it has been impossible to smoothly transfer information between the data transmitting and receiving sides. Moreover, it has been impossible to improve the efficiency of processing of the system.

SUMMARY OF THE INVENTION

Accordingly, it is an object of this invention to provide an improved information transfer control system capable of smoothly transferring information between data transmitting and receiving sides.

According to this invention there is provided an information transfer control system adapted to control bidirectional transfer of information between a first information processor and a second information processor comprising a first-in/first-out type stack provided between the first and second information processors for temporarily storing transferred information, and means responsive to the status of the stack and the direction of transfer of the information for generating a signal which is utilized to inhibit, or to show readiness for, the sending out and loading of information to control the transfer of said information on the transmitting and receiving sides.

This invention is characterized in that either in the FULL status in which data is fully stored in the stack or in the EMPTY status in which data is emptied in the stack the signal generating means generates a data transfer "inhibit" signal or data transfer "ready" signal in accordance with the direction of data transfer during transmission and reception so as to effect a smooth data transfer between transmission and reception.

DESCRIPTION OF THE PREFERRED EMBODIMENT

Figure 1:
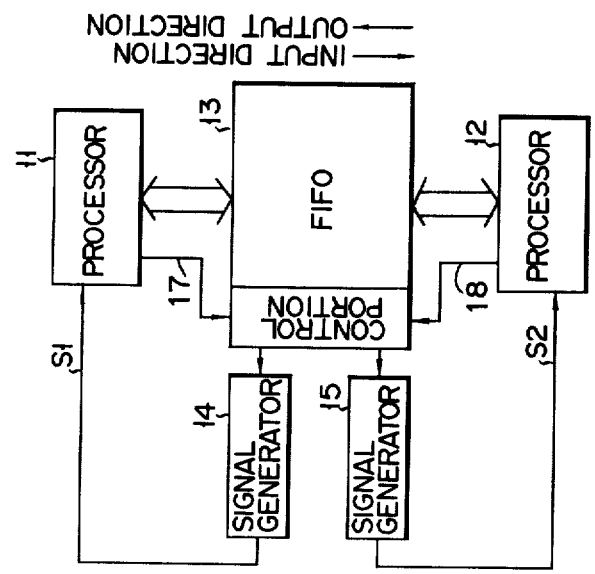
FIG. 1 is a block diagram showing the basic construction of the information transfer control system embodying the invention.

A preferred embodiment of this invention is illustrated in FIG. 1 and comprises an information processor 11 including a memory unit such as a minicomputer or a microcomputer. An information processor 12 such as a terminal device for the processor 11, a line printer interface, a disk interface, a communication terminal device or the like and a first-in/first-out (FIFO) type stack 13 which temporarily stores the information transferred from the processors 11 and 12. The stack 13 may employ a FIFO stack which transfers information from the processor 11 to the processor 12 and a FIFO stack which transfers information from processor 12 to processor 11 or a single FIFO stack capable of transferring information in both directions.

The FIFO stack 13 is provided with a first signal generator 14 and a second signal generator 15. These signal generators generate first and second signals S1 and S2 respectively depending upon the status information of the FIFO stack 13 and the direction of transfer of the information. It is defined herein that the "input direction" to the FIFO stack as shown in FIG. 1 means a first direction in which the information is transferred to the processor 12 from the processor 11 and the "output direction" with reference to the FIFO stack means a second direction in which the information is transferred from the processor 12 to the processor 11. Further, as stated before, the state in which the information is fully stored in the FIFO stack 13 is termed a FULL status whereas the state in which there is no information stored in the stack is termed an EMPTY status.

The first generator 14 is constructed to generate a first signal S1 having a logic level "1" where the direction of transfer is in the input direction with respect to the FIFO stack and the stack is in a full status and where the direction of transfer is in the output direction with respect to stack 13 and the stack is in the EMPTY status. In the same manner, the second signal generator 15 generates a second signal S2 having a logic level "1" when the direction of transfer is in input direction and the stack is in the EMPTY status and where the direction of transfer is in the output direction and the stack is in the FULL status.

Thus, the first signal S1 is supplied to the information processor 11 to control the information transfer between the information processor 11 and the FIFO stack 13, and the second signal S2 is supplied to the information processor 12 to control the information transfer between the processor 12 and the FIFO stack 13. In response to the first and second signals S1 and S2 the processors 11 and 12 respectively execute and control the operations described above.

The input and output directions with respect to the FIFO stack, that is, the directions of transferring the information, can be detected in the following manner. First, a program to be executed by the processor 11 is monitored, and when the processor 11 executes the input/output instruction, a command is transmitted according to the program to the control portion (shown in detail in FIG. 2) of the FIFO stack via a control line 17. The control portion of the FIFO stack detects the direction of transferring the information in accordance whether the received command is an input command or an output command and supplies the detected signal to the first and second signal generators 14 and 15, whereby the direction of transfer can be determined. The same operation is performed for the input/output control signal from the information processor 12.

As is well known in the art, it is possible to detect the status signals (EMPTY and FULL) of the FIFO stack by stack peripheral control circuits.

Figure 2:
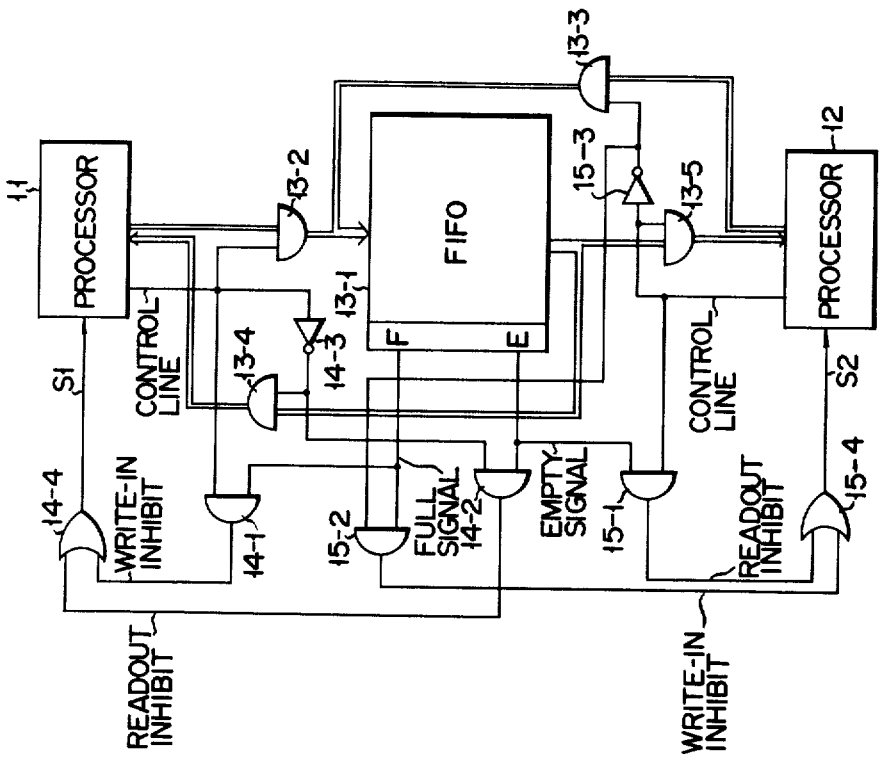
FIG. 2 is a detail circuit diagram of the information transfer control system shown in FIG. 1.

FIG. 2 shows in detail the transfer control system of FIG. 1. As shown in FIG. 2, the FIFO stack 13 includes a FIFO stack memory section 13-1, AND gates 13-2 and 13-3 connected between the input terminal of the FIFO stack memory section 13-1 and the processors 11 and 12, and AND gates 13-4 and 13-5 connected between the output terminal of the FIFO stack memory section 13-1 and the processors 11 and 12. The signal generator 14 includes AND gates 14-1 and 14-2 connected to the control line of the processor 11 directly and through an inverter 14-3 respectively, and an OR gate 14-4 connected at its input terminals to the output terminals of the AND gates 14-1 and 14-2 and at its output terminal to the processor 11. The signal generator 15 includes AND gates 15-1 and 15-2 connected to the control line of the processor 12 directly and through an inverter 15-3 respectively, and an OR gate 15-4 connected at its input terminals to the output terminals of the AND gates 15-1 and 15-2 and at its output terminal to the processor 12.

When the processors 11 and 12 produce "1" level control signals through the respective control lines, the AND gates 13-2 and 13-5 are enabled, thus permitting information transfer in the "input" direction. Under this condition, if the FIFO stack exhibits a FULL status, a FULL signal is generated from the FIFO stack 13 and is applied to the processor 11 through the AND gate 14-1 and the OR gate 14-4, thus inhibiting information transfer from the processor 11 to the FIFO stack 13. On the other hand, if the FIFO stack exhibits an EMPTY status, and EMPTY signal is generated from the FIFO stack 13 and applied to the processor 12 through the AND gate 15-1 and OR gate 15-4, thus inhibiting information transfer from the FIFO stack 13 to the processor 12.

Where the processors 11 and 12 produce "0" level control signals to permit data transfer in the "output" direction, the AND gates 14-2 and 15-2 are enabled. Under this condition, if the FIFO stack exhibits a FULL status, a FULL signal is applied to the processor 12 through the AND gate 15-2 and the OR gate 15-3, thus inhibiting information transfer from the processor 12 to the FIFO stack 13. On the other hand, if the FIFO stack exhibits an EMPTY status, an EMPTY signal is applied to the processor 11 through the AND gate 14-2 and the OR gate 14-4, thus inhibiting information transfer from the FIFO stack 13 to the processor 11.

As described above the invention provides a novel information transfer control system wherein the direction of information transfer is controlled by a program, or processor 11 or processor 12 and a status signal is produced in accordance with the status of the FIFO stack 13 so that it is not only possible to smoothly transfer the information between information processors 11 and 12 and accurately control the transfer, but also possible to improve the efficiency of transfer between systems.

Although in the foregoing embodiments the first and second signals were used as signals for inhibiting transfer of information, it is also possible to use these signal as the ready signals for the transfer of information, in which case the processors 11 and 12 commence the transfer of the information as soon as they receive the first and second signals. Furthermore, according to this invention it is also possible to control the transfer of the information by the concurrent use of the inhibit signals and the ready signals.

Further, in the disclosed embodiment control signals from the processors 11 and 12 are used to control information transfer between the processors 11 and 12 the FIFO stack 13. However, it is also possible use a control signal from only one of the processors 11 and 12 in order to effect the same information transfer control.

What we claim is:

1. An information transfer control system for controlling bidirectional transfer of information comprising:
   first and second information processors;
   a first-in first-out memory provided between said first and second information processors for temporarily storing information transferred from said first or second information processor;
   bus means interconnecting said first information processor and said first-in first-out memory and interconnecting said second information processor and said first-in first-out memory whereby information can be transferred from said first and second processors to said first-in first-out memory and from said first-in first-out memory to said first and second information processors;
   status signal generating means in said first-in first-out memory for producing a FULL signal when said memory is substantially full of information and an EMPTY signal when said memory has no stored information;
   first direction signal generating means for producing a first direction signal specifying that information is to be transferred from said first information processor to said first-in first-out memory and for producing a second direction signal specifying that information is to be transferred from said memory to said first information processor; and
   first control means having input terminals connected to said status signal generating means and said first direction signal generating means and an output terminal connected to said first information processor and applying a first data transfer inhibit signal to said first information processor when said FULL signal and said first direction signal are present at the same time and when said EMPTY signal and said second direction signal are present at the same time.

2. An information transfer control system according to claim 1, wherein said first control means includes a first AND gate circuit connected to receive said FULL signal and said first direction signal, a second AND gate circuit connected to receive said EMPTY signal and said second direction signal, and an OR gate circuit connected to receive output signals from said first and second AND gate circuits and operative to transmit said first data transfer inhibit signal to said first information processor.

3. An information transfer control system according to claim 1 or 2, further comprising:

second direction signal generating means for producing a third direction signal specifying that information is to be transferred from said second processor to said first-in first-out memory and a fourth direction signal specifying that information is to be transferred from said first-in first-out memory to said second information processor; and second control means having input terminals connected to said status signal generating means and said second direction signal generating means and an output terminal connected to said second information processor and applying a second data transfer inhibit signal to said second information processor when said FULL signal and said third direction signal are present at the same time and when said EMPTY signal and said fourth direction signal are present at the same time.

4. An information transfer control system according to claim 3, wherein said second control means includes a third AND gate circuit connected to receive said FULL signal and said third direction signal, a fourth AND gate circuit connected to receive said EMPTY signal and said fourth direction signal, and an OR gate circuit connected to receive output signals from said third and fourth AND gate circuits and operative to transmit said second data transfer inhibit signal to said second information processor.

* * * * *